UNITED STATES PATENT OFFICE.

FERNAND HAMEL, OF PARIS, FRANCE.

PROCESS OF MANUFACTURING ARTIFICIAL FRUIT AND OTHER PLASTIC OBJECTS.

976,359.  Specification of Letters Patent.  Patented Nov. 22, 1910.

No Drawing.   Application filed February 3, 1909. Serial No. 475,918.

*To all whom it may concern:*

Be it known that I, FERNAND HAMEL, a citizen of the French Republic, and resident of Paris, France, have invented new and useful Improvements in Processes of Manufacturing Artificial Fruit and other Plastic Objects, of which the following is a specification.

The present invention relates to an improved process for the manufacture of artificial fruit and other plastic objects which is thereby characterized that the permanence of the definite form of the object results from the immersion into successive baths of substances which are adapted to coagulate or to solidify when being exposed to the air, of a support of thin india-rubber which has previously been molded and then inflated.

Actually artificial fruit, for example the fruit used for decorating hats, is manufactured by means of a support or core of cotton or similar material which is molded to assume a convenient shape and thereupon immersed in a bath of gelatin. This material fills up the interstices of the cotton and forms a coating of suitable thickness. This method of manufacture has the disadvantage that the objects obtained are rather heavy and that further a comparatively large quantity of material is required whereby the manufacturing costs are increased.

According to the present invention the support for the coagulating substance is constituted by a thin india-rubber balloon, which has previously by any of the well known processes been molded so that it adopts the shape of the object to be manufactured when it has been inflated. The inflated balloon may have the original size of the object to be made or it may be of slightly smaller size to allow for the coating of coagulable substance. The inflated balloon must of course constantly have the shape of the object to be made. The india-rubber balloon is thereupon immersed successively into several baths of coagulable or such substances which will solidify by desiccation, which serve to give the final and permanent shape to the object.

The composition of the baths to be used with the present process may vary according to the objects to be manufactured. The following compositions are cited by way of example only, they can be used for the manufacture of artificial fruit. The first bath used for the manufacture of artificial fruit is composed as follows:—a solution of transparent or opaque gelatin admixed with glycerin which has been colored according to the color to be given to the object. With this bath a solution of india-rubber can be admixed. The second and third baths consist of a spirit-varnish which has been colored or not. The fourth bath consists of colored or colorless gelatin which has been made insoluble or not. If the india-rubber support has to be withdrawn from the manufactured object, a small hole is left through which the balloon can be removed.

The same process can be used for the manufacture of other objects than artificial fruit, for example, for the manufacture of toys, dolls, balls and the like.

I claim:—

An improved process for the manufacture of artificial fruit and other plastic objects, consisting in inflating an india-rubber balloon of the shape of the fruit to be made and immersing the same successively in baths of coagulable substances, substantially as herein described.

In witness whereof I have hereunto set my hand in the presence of two witnesses.

FERNAND HAMEL.

Witnesses:
 CHARLES PETITJEAN,
 H. C. COXE.